United States Patent [19]

Bradford et al.

[11] Patent Number: 5,756,656
[45] Date of Patent: May 26, 1998

[54] PROCESS FOR THE PREPARTION OF COPOLYMERS

[75] Inventors: Arleen Marie Bradford; Andre Buys, both of Amsterdam, Netherlands

[73] Assignee: Shell Oil Company, Houston, Tex.

[21] Appl. No.: 794,222

[22] Filed: Jan. 30, 1997

[30] Foreign Application Priority Data

Feb. 1, 1996 [EP] European Pat. Off. ............ 96200216

[51] Int. Cl.[6] ................................................. C08G 67/02
[52] U.S. Cl. ...................... 528/392; 528/392; 524/701; 524/706; 524/709; 524/711; 524/714; 524/792; 502/102; 502/103
[58] Field of Search ........................... 528/392; 524/701, 524/706, 709, 711, 714, 792; 502/102, 103

[56] References Cited

FOREIGN PATENT DOCUMENTS

| 121965 | 10/1984 | European Pat. Off. . |
|---|---|---|
| 372602 | 6/1990 | European Pat. Off. . |
| 0/522635 A1 | 6/1992 | European Pat. Off. . |
| 501586 | 9/1992 | European Pat. Off. . |
| 504985 | 9/1992 | European Pat. Off. . |
| 94/12559 | 6/1994 | WIPO . |
| 94/24190 | 10/1994 | WIPO . |

*Primary Examiner*—Samuel A. Acquah

[57] ABSTRACT

A process for the preparation of a copolymer of carbon monoxide with an olefinically unsaturated compound, comprising copolymerizing the monomers in the presence of a Group VIII metal containing catalyst composition and in the presence of an olefinically unsaturated compound (A) which contains in its molecular structure an organic group imparting steric hindrance on the vinyl group. A copolymer obtainable by the said process.

10 Claims, No Drawings

PROCESS FOR THE PREPARTION OF COPOLYMERS

The invention relates to a process for the preparation of copolymers comprising copolymerizing carbon monoxide with an olefinically unsaturated compound in the presence of a Group VIII metal containing catalyst composition.

Processes of this kind are well known in the art, for example from EP-A-121965 and EP-A-248483. The copolymers prepared are linear copolymers wherein the monomer units originating from carbon monoxide and the monomer units originating from the olefinically unsaturated compounds occur in alternating or substantially alternating order.

The copolymers have frequently a high molecular weight, in which case they have attractive performance properties for use as engineering thermoplastics, such as a high tensile strength and impact resistance. Some of these performance properties depend of the molecular weight of the copolymers. In other cases the copolymers have a relatively low molecular weight, in which cases they can advantageously be used as a component in thermosetting resins.

Thus, it is important that in the preparation of the copolymers suitable conditions are selected such that the copolymer prepared has the molecular weight suitable for the application envisaged.

Various methods have been proposed by which the molecular weight of the copolymer can be influenced. One method involves the selection of the polymerization temperature. For example, an increase of the polymerization temperature will effect a decrease of the molecular weight. However, a disadvantage of this method is that at the higher temperature the stability of the catalyst composition may become a problem.

WO-94/24190 discloses that copolymers with a lower molecular weight can be prepared by carrying out the copolymerization in the presence of a compound containing a 1-alkenyl substituted aryl group, such as styrene or 2-vinylnaphthalene.

It has now been found that the molecular weight of the polymer may be decreased very effectively by carrying out the copolymerization in the presence of a small amount of a sterically hindered olefin, such as 3,3-dimethylbutene-1. This is quite unexpected because these olefins have a group attached to the vinyl group imparting steric hindrance on the vinyl group and they may therefore be expected not to have an affinity to the Group VIII metal of the polymerization catalyst. The surprising, high effectiveness is apparent from the low intake level of the sterically hindered olefin at which a sizeable reduction of the molecular weight can be seen, as compared with the intake of 1-alkenylaryl compound applied in WO 94/24190.

Furthermore, it is an unexpected advantage that the rate of polymerization found when the sterically hindered olefin is present is not lower than the rate found in the absence thereof. This is in contrast with the use of 1-alkenylaryl compounds which are reported to cause a decrease of the polymerization rate.

Thus, the present invention relates to a process for the preparation of a copolymer of carbon monoxide with an olefinically unsaturated compound, comprising copolymerizing the monomers in the presence of a Group VIII metal containing catalyst composition and in the presence of an olefinically unsaturated compound (A) which contains in its molecular structure an organic group imparting steric hindrance on the vinyl group.

As indicated, according to this invention the copolymerization is carried out in the presence of a compound A, which comprises a vinyl group connected to a sterically hindering organic group. Suitable compounds A are of the general formula $R^1{}_3C-D-CR^2=CH_2$, wherein each $R^1$ independently represents a hydrocarbyl group, $R^2$ represents a hydrocarbyl group or a hydrogen atom and D represents a linking group or a chemical bond. Hydrocarbyl groups $R^1$ and $R^2$ have typically up to 10 carbon atoms, more typically up to 5. Preferred groups $R^1$ are alkyl or cycloalkyl groups, for example 1-butyl, 2-propyl or cyclohexyl groups. Most preferred groups $R^1$ are straight chain 1-alkyl groups, and in particular methyl groups. Preferred hydrocarbyl groups $R^2$ are alkyl groups, in particular straight chain 1-alkyl groups, for example methyl or 1-butyl groups. However, $R^2$ is most preferably a hydrogen atom. The linking group D comprises typically up to 10 carbon atoms. It has at most 3 atoms in the link connecting the group $R^1{}_3C-$ with the vinyl group $-CR^2=CH_2$. The linking group may be an alkylene or alkylidene group, typically of up to 6 carbon atoms, such as a methylene group, ethylidene group, ethylene group, 1,2-propylene group or 1,2,3-trimethyl-1,3-propylene group. D represents preferably a chemical bond. The groups $R^1$ and $R^2$ and the linking group D, if any is present, may comprise heteroatoms, such as halogen, silicon, oxygen and nitrogen.

A very good result can be accomplished by using 3,3-dimethylbutene-1 as the compound A.

The quantity of the compound A which can be applied in the invented process may vary between wide ranges and by routine experimentation a skilled person will be able to determine the quantity which suits his purpose. Typical quantities are in the range of 1–10.000 mole per gram atom Group VIII metal, in particular 10–5,000 mole on the same basis.

Without wishing to be bound by any theoretical explanation of the reaction mechanism, it is considered likely that during the copolymerization a molecule of compound A combines with the catalyst thus preventing that a further monomer molecule combines with the catalyst. The growth of the polymer chain is thereby interrupted and one of the end-groups of the resulting reaction product will be derived from compound A.

It has been found that when use is made of a compound A which is of the general formula $R^1{}_3C-D-CR^2=CH_2$, wherein $R^1$, $R^2$ and D are as defined hereinbefore, a copolymer is obtained which comprises polymer chains which carry an end group of the general formula $-CO-CH_2-CHR^2-D-CR^1{}_3$.

Accordingly, the present invention also relates to copolymers of carbon monoxide and an olefinically unsaturated compound which are obtainable by the process of this invention, in particular to copolymers which comprises polymer chains carrying an end group of the general formula $-CO-CH_2-CHR^2-D-CR^1{}_3$, wherein $R^1$, $R^2$ and D are as defined hereinbefore. Typically between 0.5 and 50%, more typically between 1 and 25% of the polymer chains, carry such an end group.

The copolymers of this invention have typically a limiting viscosity number in the range of 0.1–5 dl/g, in particular 0.5–3 dl/g, based on viscosity measurements at 35° C. of solutions of the copolymers in hexafluoroisopropanol.

Olefinically unsaturated compounds which can be used as monomers in the copolymerization process of the invention include compounds consisting exclusively of carbon and hydrogen and compounds which in addition comprise hetero atoms, such as unsaturated esters, ethers and amides. Unsaturated hydrocarbons are preferred. It will be clear to the skilled person that the olefinically unsaturated compound used as monomer will be another than compound A. Examples of suitable olefinic monomers are lower olefins, such as ethene, propene and butene-1, cyclic olefins such as cyclopentene, aromatic compounds, such as styrene and α-methylstyrene and vinyl esters, such as vinyl acetate and vinyl propionate. Most preference is given to ethene and mixtures of ethene with another olefinically unsaturated compound, in particular an α-olefin, such as propene or butene-1. The term "lower" used in this document to specify an organic compound has the meaning that the organic compound contains up to 6 carbon atoms.

Generally, the molar ratio of on the one hand carbon monoxide and on the other hand the olefinically unsaturated compound(s) used as monomer is selected in the range of 1:5 to 5:1. Preferably the molar ratio is in the range of 1:2 to 2:1, substantially equimolar ratios being preferred most.

Examples of suitable Group VIII metals for use in the catalyst composition are nickel and cobalt. However, the Group VIII metal is preferably a noble Group VIII metal, of which palladium is most preferred.

The Group VIII metal is typically employed as a cationic species. As the source of Group VIII metal cations conveniently a Group VIII metal salt is used. Suitable salts include salts of mineral acids such as sulphuric acid, nitric acid, phosphoric acid and perchloric acid, and organic salts, such as acetylacetonates and salts of sulphonic acids. Preferably, a salt of a carboxylic acid is used, for example a carboxylic acid with up to 8 carbon atoms, such as acetic acid, trifluoroacetic acid, trichloroacetic acid, propionic acid and citric acid. Palladium (II) acetate and palladium (II) trifluoroacetate represent particularly preferred sources of palladium cations. Another suitable source of Group VIII metal cations is a compound of the Group VIII metal in its zero-valent state.

The catalyst composition of the invented process is preferably based, as an additional component, on a ligand which forms a complex with the Group VIII metal. It would appear that the presence of two complexing sites in one ligand molecule significantly contributes to the activity of the catalysts. It is thus preferred to use a ligand containing at least two dentate groups which can complex with the Group VIII metal. Although less preferred, it is also possible to employ a monodentate ligand, i.e. a compound which contains a single dentate group which can complex with the Group VIII metal, in particular a dentate group of phosphorus. Suitably a bidentate ligand is used which contains two phosphorus-, nitrogen- or sulphur containing dentate groups. It is also possible to use a mixed bidentate ligand such as 1-diphenylphosphino-3-ethylthiopropane.

A preferred group of bidentate ligands can be indicated by the general formula

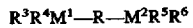
(I)

In this formula $M^1$ and $M^2$ independently represent a phosphorus, nitrogen, arsenic or antimony atom, $R^3$, $R^4$, $R^5$ and $R^6$ independently represent a non-substituted or polar substituted hydrocarbyl group, in particular of up to 10 carbon atoms, and R represents a bivalent organic bridging group containing at least 1 carbon atom in the bridge. The bridging group R comprises typically up to 10 carbon atoms.

In the ligands of formula (I) $M^1$ and $M^2$ preferably represent phosphorus atoms. $R^3$, $R^4$, $R^5$ and $R^6$ may independently represent optionally polar substituted alkyl, aryl, alkaryl, aralkyl or cycloalkyl groups. Preferably at least one of $R^3$, $R^4$, $R^5$ and $R^6$ represents an aromatic group, in particular an aromatic group which is polar substituted.

Suitable polar groups include halogen atoms, such as fluorine and chlorine, alkoxy groups such as methoxy and ethoxy groups and alkylamino groups such as methylamino-, dimethylamino- and diethylamino groups. Alkoxy groups and alkylamino groups contain in particular up to 5 carbon atoms in each of their alkyl groups.

It is preferred that one or more of $R^3$, $R^4$, $R^5$ and $R^6$ represents an aryl group, preferably a phenyl group, substituted at an ortho position with respect to $M^1$ or $M^2$ with an alkoxy group, especially a methoxy group.

In the ligands of formula (I), R preferably represents a bivalent organic bridging group containing from 2 to 4 bridging atoms, at least two of which are carbon atoms. Examples of such groups R are —$CH_2$—$CH_2$—, —$CH_2$—$CH_2$—$CH_2$—, —$CH_2$—$C(CH_3)_2$—$CH_2$—, —$CH_2$—Si$(CH_3)_2$—$CH_2$—, and —$CH_2$—$CH_2$—$CH_2$—$CH_2$—. Preferably R is a trimethylene group. Preferred ligands are 1,3-bis[bis(2,4-dimethoxyphenyl)-phosphino]propane, 1,3-bis[bis(2,4,6-trimethoxyphenyl)phosphino]propane and, more preferred, 1,3-bis[bis(2-methoxyphenyl)-phosphino]propane.

Other suitable bidentate ligands are nitrogen containing compounds of the general formula

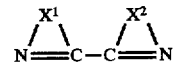

wherein $X^1$ and $X^2$ independently represent organic bridging groups each containing 3 or 4 atoms in the bridge at least 2 of which are carbon atoms. There may be an additional bridging group connecting the bridging groups $X^1$ and $X^2$. Examples of such compounds are 2,2'-bipyridine, 4,4'-dimethyl-2,2'-bipyridine, 4,4'-dimethozy-2,2'-bipyridine, 1,10-phenanthroline, 4,7-diphenyl-1,10-phenanthroline and 4,7-dimethyl-1,10-phenanthroline. Preferred compounds are 2,2'-bipyridine and 1,10-phenanthroline.

Again other suitable bidentate ligands are sulphur containing compounds of the general formula

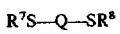

wherein $R^7$ and $R^8$ independently represent a non-substituted or polar substituted hydrocarbyl group and Q represents a bivalent bridging group containing 2 to 4 carbon atoms in the bridge. The groups $R^7$ and $R^8$ are preferably alkyl groups, each having in particular up to 10 carbon atoms. Very suitable bis thio compounds are 1,2-bis(ethylthio)ethane and 1,2-bis(propylthio)ethene.

The amount of ligand supplied may vary considerably, but is usually dependent on the amount of Group VIII metal present in the catalyst composition. Preferred amounts of bidentate ligands are in the range of from 0.5 to 8, more preferably in the range of from 0.5 to 2 moles per gram atom of Group VIII metal, unless the bidentate ligand is a nitrogen bidentate ligand, in which case the bidentate ligand is preferably present in an amount of from 0.5 to 200 and in particular 1 to 50 moles per gram atom of Group VIII metal. The monodentate ligands are preferably present in an amount of from 0.5 to 50 and in particular 1 to 25 moles per gram atom of Group VIII metal.

The Group VIII metal containing catalyst compositions may be based on another additional component which functions during the copolymerization as a source of anions which are non- or only weakly coordinating with the Group VIII metal under the conditions of the copolymerization. Typical additional components are, for example, protic acids, salts of protic acids, Lewis acids, acids obtainable by combining a Lewis acid and a protic acid, and salts derivable from such combinations. Suitable are strong protic acids and their salts, which strong protic acids have in particular a pKa of less than 6, more in particular less than 4, preferably less than 2, when measured in aqueous solution at 18° C. Examples of suitable protic acids are the above mentioned acids which may also participate in the Group VIII salts, e.g. perchloric acid and trifluoroacetic acid. Suitable salts of protic acids are, for example, cobalt and nickel salts. Other suitable protic acids are adducts of boric acid and 1,2-diols, catechols or salicylic acids. Salts of these adducts may be used as well. Suitable Lewis acids are, for example, $BF_3$, $AlF_3$, $AsF_5$ and $Sn(CF_3SO_3)_2$, and also hydrocarbylboranes, such as triphenylborane, tris(perfluorophenyl)borane, tris(4-chlorophenyl)borane and tris(bis-3,5-(trifluoromethyl) phenyl)borane. Protic acids with which Lewis acids may be combined are for example sulphonic acids and hydrohalogenic acids, in particular HF. A very suitable combination of a Lewis acid with a protic acid is tetrafluoroboric acid ($HBF_4$). Other compounds which function during the copolymerization as a source of anions which are non- or only weakly co-ordinating with the Group VIII metal are salts which contain one or more hydrocarbylborate anions or carborate anions, such as sodium tetrakis[bis-3,5-(trifluoromethyl)phenyl]borate, lithium tetrakis (perfluorophenyl)borate and cobalt carborate ($Co(B_{11}CH_{12})_2$). Again other compounds which may be mentioned in this context are aluminoxanes, in particular methyl aluminoxanes and t-butyl aluminoxanes.

The amount of the additional component which functions during the copolymerization as a source of anions which are non- or only weakly co-ordinating with the Group VIII metal is preferably selected in the range of from 0.1 to 50 equivalents per gram atom of Group VIII metal, in particular in the range of from 0.5 to 25 equivalents per gram atom of Group VIII metal. However, the aluminoxanes may be used in such a quantity that the molar ratio of aluminium to the Group VIII metal is in the range of from 4000:1 to 10:1, preferably from 2000:1 to 100:1.

The amount of catalyst composition used in the process of the invention may vary between wide limits. Recommended quantities of catalyst composition are in the range of $10^{-8}$ to $10^{-2}$, calculated as gram atoms of Group VIII metal per mole of olefinically unsaturated compound to be copolymerized with carbon monoxide, which excludes the quantity of compound A present. Preferred quantities are in the range of $10^{-7}$ to $10^{-3}$ on the same basis.

The copolymerization process of this invention may be carried out in the presence of a liquid diluent, but it may also be carried out as a gas phase process. If it is carried out in the presence of a liquid diluent preferably a liquid diluent is used in which the copolymer to be prepared forms a suspension, in which case a diluent may be selected in which the copolymer is insoluble or virtually insoluble. Examples of liquid diluents are ketones (e.g. acetone), chlorinated hydrocarbons (e.g. chloroform or dichloromethane), aromatics (e.g. toluene, benzene, chlorobenzene) and, preferably, protic diluents, such as lower alcohols (e.g. methanol and ethanol). Mixtures of liquid diluents may be used as well, for example protic diluents may comprise an aprotic diluent.

When the process of the invention is carried out as a gas phase process it is preferred to use a catalyst system supported on a solid carrier, usually in order to facilitate the introduction of the catalyst system into the reactor.

Suitable carrier materials may be inorganic, such as silica, alumina or charcoal, or organic such as cellulose or dextrose. Furthermore a polymer material may be used as carrier, such as polyethene, polypropene or, in particular, copolymers of carbon monoxide with an olefinically unsaturated compound, for example linear alternating copolymers of carbon monoxide with ethene or carbon monoxide with ethene and propene or butene-1.

Conveniently the carrier is impregnated with a solution of the catalyst system in a suitable liquid It will be appreciated that the amount of liquid used is relatively small, so that any excess thereof can easily be removed before or during the initial stage of the copolymerization process. On the other hand it has been observed, that the addition of a minor amount of liquid during the copolymerization process has a delaying effect on the deactivation rate of the catalyst, the quantity of liquid being so small that the gas phase is the continuous phase during the polymerization. The quantity of liquid is in particular selected such that it is 20–80% by weight, more in particular 40–60% by weight, of the quantity which is sufficient to saturate the gas phase under the conditions of the polymerization. Polar liquids are preferred, such as lower alcohols, for example methanol and ethanol, lower ethers such as diethylether, tetrahydrofuran or the dimethylether of diethylene glycol (diglyme) and lower ketones such as acetone and methylethylketone.

The performance of Group VIII metal catalyst compositions in the copolymerization process may be improved by introducing an organic oxidant, such as a quinone or an aromatic nitro compound. Preferred oxidants are quinones selected from the group consisting of benzoquinone, naphthoquinone and anthraquinone. When the process is carried out as a gas phase process, the quantity of oxidant is advantageously in the range of from 1 to 50, preferably in the range of from 1 to 20 mole per gram atom of metal of Group VIII The copolymerization process is usually carried out at a temperature between 20° and 200° C., preferably at a temperature in the range of from 30° to 150° C., and usually applying a pressure between 0.2 and 20 MPa, pressures in the range of from 1 to 10 MPa being preferred.

The copolymer may be recovered from the polymerization mixture by any suitable conventional technique.

The copolymers obtained according to the invention are particularly suitable as thermoplastics for fibres, films or sheets, or for injection moulding, compression moulding and blow moulding applications. They may be used for applications in the car industry, for the manufacture of packaging materials for food and drinks and for various uses in the domestic sphere. In view of the sterically hindering end groups present in the copolymers of this invention it is conceivable that the copolymers possess an improved chemical stability and an improved durability in hot or oxidative environments compared with the known copolymers.

The invention is now illustrated by means of the following examples.

EXAMPLE 1 (FOR COMPARISON)

A linear alternating copolymer of carbon monoxide with ethene was prepared as follows.

A catalyst solution was prepared as follows: 57.4 mg (0.11 mmole) of 1,3-bis[bis(ortho-methoxyphenyl)phosphino] propane was dissolved in 2.5 ml of tetrahydrofuran. After complete dissolution, the solution was added to 22.0 mg (0.10 mmole) of palladium (II) acetate. Subsequently 17.5 ml of methanol was added and the mixture was stirred during 1 hour. Subsequently 89.4 mg (0.24 mmole) of nickel perchlorate and 33.4 mg (0.22 mmole) of naphthoquinone were dissolved in the solution. Of the resulting solution 2.0 ml was taken and diluted with 2.0 ml of methanol.

Of the resulting 4.0 ml of diluted catalyst solution 1 ml was charged to a 0.5 l autoclave, together with 8 gram of a dried, previously prepared terpolymer of carbon monoxide, ethene and propene. The autoclave was equipped with a fixed stirring device and an automatic pressure relief.

Subsequently, the reactor was closed and pressurized at 5.0 MPa with nitrogen. The pressure was released and the autoclave was purged twice with carbon monoxide (0.6 MPa), after which it was pressurized with carbon monoxide (2.4 MPa) and ethene (2.4 MPa).

The contents of the reactor were heated to 90° C. The supply of carbon monoxide/ethene feed (molar ratio 1:1) was started to maintain the pressure at 5.0 MPa absolute.

A solution of 111.3 mg of naphthoquinone in 100 ml of methanol was added at a rate of 2.0 ml per mg palladium per hour, starting 0.5 hour after the beginning of the reaction (defined as the moment that the temperature of the reaction mixture reached 60° C.).

The copolymerization reaction was stopped by automatic pressure relief after a reaction period of 5 hours. The product was recovered, dried overnight in a vacuum oven under a nitrogen purge at 50° C. and weighed.

The average polymerization rate was 16 kg copolymer/(g palladium.hour). The intrinsic viscosity (Limiting Viscosity Number, LVN) of the copolymer obtained was 3.0 dl/g, calculated from determined viscosity values, measured for different copolymer concentrations in hexafluoroisopropanol at 35° C.

EXAMPLE 2

A linear alternating copolymer of carbon monoxide and ethene was prepared using the methods of Example 1, with the difference that the naphthoquinone solution fed to the polymerization mixture contained in addition 412 mg 3,3-dimethylbutene-1 per 100 ml methanol.

The average polymerization rate was 17 kg copolymer/(g palladium.hour). The intrinsic viscosity (Limiting Viscosity Number, LVN) of the copolymer obtained was 2.6 dl/g.

The LVN values found indicate that the number average molecular weight of the copolymer of Example 2 (according to the invention) was about 20% lower than the number average molecular weight of the copolymer of Example 1 (comparative). The average polymerization rates found in Example 2 was not below that found in Example 1. The intake of 3,3-dimethylbutene-1 in Example 2 was as low as 44 mole per gram atom palladium. The intake of styrene or substituted styrenes in the working examples of WO 94/24190 was about 5,000 mole per gram atom palladium. This gave a substantial reduction in the rate of polymerization. When 2-vinylnaphthalene was used the polymerization rate was reduced even to about 2% of the original value.

$^{13}$C—NMR analysis confirmed that the copolymers obtained in Examples 1 and 2 were linear polymers of which the chains consisted of monomer units of carbon monoxide and monomer units of ethene arranged in an alternating order. About 4% of the polymer chains of the copolymer obtained in Example 2 contained an end group of the formula —CO—CH$_2$—CH$_2$—C(CH$_3$)$_3$, i.e. derived from 3,3-dimethylbutene-1.

We claim:

1. A process for the preparation of a copolymer of carbon monoxide with an olefinically unsaturated compound, comprising copolymerizing monomers comprising carbon monoxide and an olefinically unsaturated compound in the presence of a Group VIII metal containing catalyst in the presence of a compound having a sterically hindered vinyl group.

2. A process as claimed in claim 1, wherein compound having a sterically hindered vinyl group is of the general formula $R^1_3C$—D—$CR^2$=$CH_2$, wherein each $R^1$ independently represents a hydrocarbyl group, $R^2$ represents a hydarocarbyl group or a hydrogen atom and D represents a chemical bond or a linking group having at most 3 atoms in the link connecting the group $R^1_3C$— with the vinyl group —$CR^2$=$CH_2$.

3. A process as claimed in claim 2, wherein the groups $R^1$ are straight chain 1-alkyl groups, $R^2$ represents a hydrogen atom and D represents a chemical bond.

4. A process as claimed in claim 3 wherein the applied quantity of the compound having a sterically hindered vinyl group is in the range of 1–10,000 mole per gram atom Group VIII metal.

5. A process as claimed in claim 4 wherein the applied quantity of compound having a sterically hindered vinyl group is in the range of 10–5,000 mole per gram atom Group VIII metal.

6. A process as claimed in claim 1 wherein the catalyst comprises palladium as the Group VIII metal and further comprises a bidentate ligand of the formula $R^3R^4M^1$-R-$M^2R^5R^6$(I), wherein $M^1$ and $M^2$ independently represent a phosphorous, nitrogen, arsenic or antimony atom, $R^3$, $R^4$, $R^5$, and $R^6$ independently represent a non-substituted or polar substituted hydrocarbyl group and R represents a bivalent organic bridging group containing at least 1 carbon atom in the bridge, which bidentate ligand is present in an amount of from 0.5 to 2 moles per gram atom of Group VIII metal.

7. A process as claimed in claim 6, wherein $M^1$ and $M^2$ represent phosphorous atoms, one or more of $R^3$, $R^4$, $R^5$ and $R^6$ represents a phenyl group substituted at an ortho position with respect to $M^1$ or $M^2$ with an alkoxy group, and R contains from 2 to 4 bridging atoms, at least two of which are carbon atoms.

8. A process as claimed in claim 6 wherein the catalyst further comprises a compound selected from the group consisting of protic acids, salts of protic acids, Lewis acids, acids obtainable by combining a Lewis acid and a protic acid, salts derivable from such combinations, salts which comprise hydrocarbylborate anions salts which comprise carborate anions, and aluminoxanes.

9. A process as claimed in claim 1, used for the copolymerization of carbon monoxide with one or more olefinically unsaturated compound, the amount of catalyst being in the range of $10^{-7}$ to $10^{-3}$, calculated as gram atoms of Group VIII metal per mole of olefinically unsaturated compound to be copolymerized with carbon monoxide, the temperature being between 30° and 150° C., and the pressure between 1 and 10 Mpa.

10. A copolymer of carbon monoxide and an olefinically unsaturated compound which copolymer is produced by a process as claimed in claim 1.

* * * * *